United States Patent [19]

Latimer

[11] Patent Number: 5,043,063

[45] Date of Patent: Aug. 27, 1991

[54] MAGNETIC TRAP AND CLEANING MEANS THEREFOR

[75] Inventor: Michael W. Latimer, Fairview, Pa.

[73] Assignee: Eriez Manufacturing Company, Erie, Pa.

[21] Appl. No.: 496,921

[22] Filed: Mar. 21, 1990

[51] Int. Cl.[5] .............................................. B01D 35/06

[52] U.S. Cl. ........................................ 210/222; 55/100

[58] Field of Search ........................ 210/222, 695, 223; 55/100, 3; 184/6.25; 335/305; 209/228; 294/65.5

[56] References Cited

U.S. PATENT DOCUMENTS

| | | | |
|---|---|---|---|
| 2,789,655 | 4/1957 | Michael et al. | 210/223 |
| 3,712,472 | 1/1973 | Elliott | 210/222 |
| 4,722,788 | 2/1988 | Nakamura | 210/222 |
| 4,867,869 | 9/1989 | Barrett | 209/228 |

*Primary Examiner*—W. Gary Jones

*Assistant Examiner*—Matthew O. Savage

*Attorney, Agent, or Firm*—Charles L. Lovercheck; Wayne L. Lovercheck; Dale Lovercheck

[57] ABSTRACT

A magnetic trap made up of a hollow, generally cylindrical body, having an open top, an inlet and an outlet for connecting to a flow line for liquid containing entrained removable magnetic material. There is a removable cover for the hollow body, a plate is supported on the cover, and elongated, spaced non-magnetic tubes are fixed to the cover. Elongated stacks of permanent magnets are attached to the plate and extend through the cover into the tubes. When magnetic material held to the tubes by the magnets is to be removed, the cover can be removed from the body, the magnetic stacks can be pulled out of the non-magnetic tubes with the plate, thereby removing the magnetic fields from the tubes so that the magnetic material held to the tubes falls off of the tubes, thereby cleaning the tubes.

3 Claims, 3 Drawing Sheets

MAGNETIC TRAP AND CLEANING MEANS THEREFOR

STATEMENT OF THE INVENTION

The invention relates to magnetic separators and more particularly to magnetic traps for removing tramp iron particles or pieces of undesirable ferrous material from a fluid flowing through the trap. Various attempts by others have been unsuccessfully made to provide an improved magnetic separator that is efficient to use, easy to clean and simple to operate.

It is an object of the invention to provide an improved magnetic trap.

Another object of the invention is to provide a magnetic trap that is simple in construction, economical to manufacture and simple and efficient to use.

Another object of the invention is to provide a magnetic trap which has a removable cover plate with elongated magnetic members fixed thereto and a magnet support plate with non-magnetic tubes which receive the magnetic members.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BACKGROUND OF THE INVENTION

Applicant is aware of the following United States Patents, all of which show permanent magnets in tubes, but none of which show the arrangement of tubes with permanent magnets therein like those claimed by applicant.

U.S. Pat. No. 3,712,472 to Elliott and U.S. Pat. No. 4,722,788 to Nakamura.

DESCRIPTION OF THE PREFERRED EMBODIMENT

Figure 1:
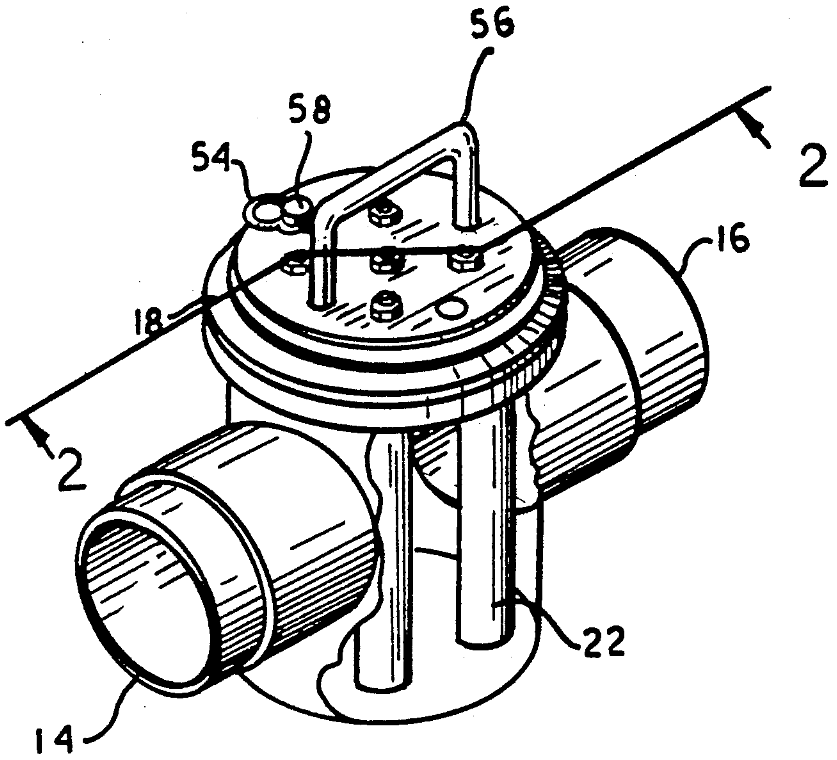
FIG. 1 is an isometric view of the trap according to the invention with the cover plate and the magnet support plate in position and the trap body being partly broken away to show the non-magnetic tubes inside.

Now with more particular reference to the drawings, magnetic trap 10 is shown, made up of hollow body 12, having cover 18, and magnetic assembly 30 supported on cover 18.

Body 12 is generally cylindrical in cross section, and has open top 11, closed bottom 13, inlet 14, side walls 15 and outlet 16.

Cover 18 may be held in place on body 12 by a suitable clamping arrangement, such as by C-ring 59, which is C-shaped in cross section having its ends held together by suitable clamping means. Cover 18 has a plurality of first spaced holes 20 and a plurality of spaced non-magnetic tubes 22. Each non-magnetic tube 22 has open upper end 24 and an open lower end, which is closed by magnetic closure members 26 which may be held in place in holes 20 by a suitable means such as soldering or brazing. Cover 18 has a reduced size part 20' that is received in open top 11 of body 12 which locates cover 18 in position. Downwardly facing peripheral groove 44 is formed in the underside of cover 18 and is adapted to receive an O-ring.

Magnetic assembly 30 is made up of magnet support plate 28, handle 56, permanent magnets 42, rods 34, pole pieces 43 and upper plug 23. Magnet stacks 31 are made up of spaced stacks of permanent magnets 42 with iron pole pieces 43 between adjacent permanent magnets 42. Permanent magnets 42, iron pole pieces 43 and closure member 26 have centrally extending holes which receive rods 34. Rods 34 extend through holes 48 in magnet support plate 28. Permanent magnets 42 and iron pole pieces 43 are held to magnet support plate 28 by rods 34. Magnet stacks 31 are held to magnet support plate 28 by rods 34 with nuts 50 and washers 52 on their upper threaded ends. Magnet assembly 30 is clamped to cover 18 by stud 58 and key 54.

Permanent magnets 42 may be made of barium ferrite or other magnet material. It will be noted that permanent magnets 42 each have a north pole and a south pole. Each permanent magnet 42 are arranged with unlike poles adjacent each other and with like poles adjacent each iron pole pieces 43. Iron pole pieces 43 are as thin as practical to concentrate the field while avoiding saturation of the edges of the pole pieces. This results in a plurality of spaced fields that extend from iron pole pieces 43. Magnetic fields extend through non-magnetic tubes 22 out into the liquid that flows between non-magnetic tubes 22. Since the magnetic field extends out from non-magnetic tubes 22 into the space between non-magnetic tubes 22, this field efficiently attracts magnetic particles of iron suspended in the liquid to non-magnetic tubes 22.

Figure 2:
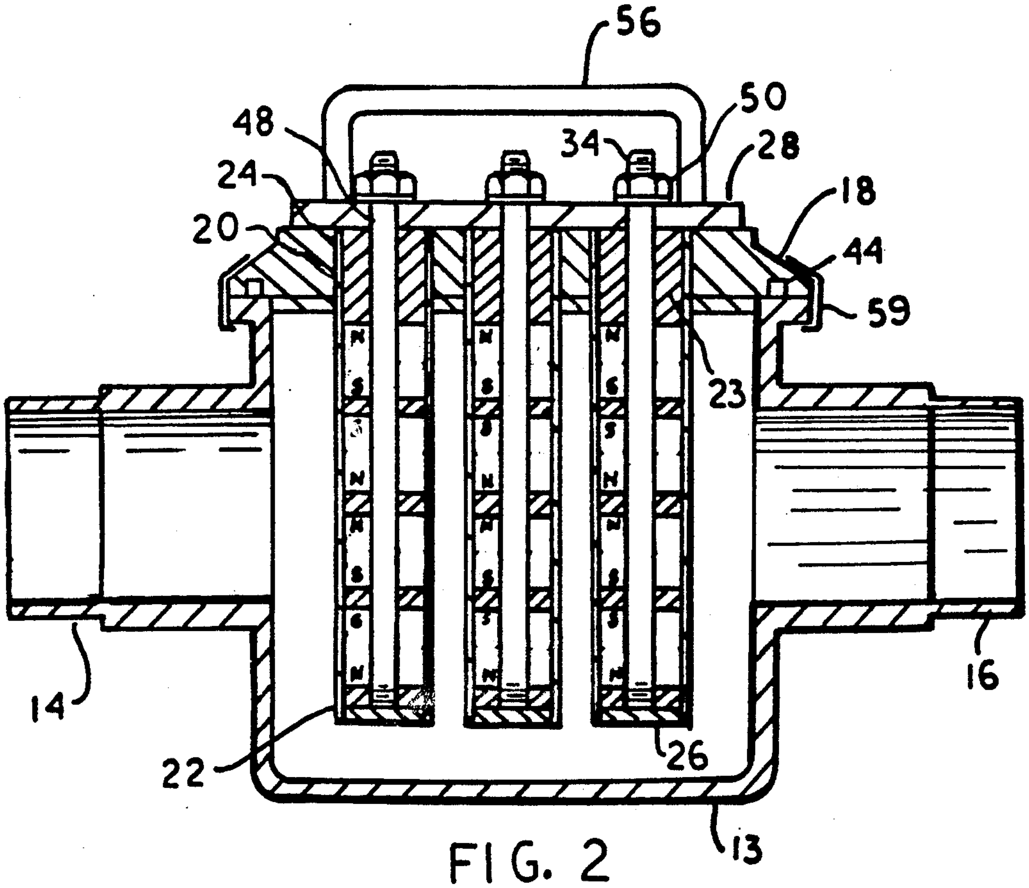
FIG. 2 is a longitudinal cross sectional view of the trap taken on lines 2—2 of FIG. 1.
Figure 3:
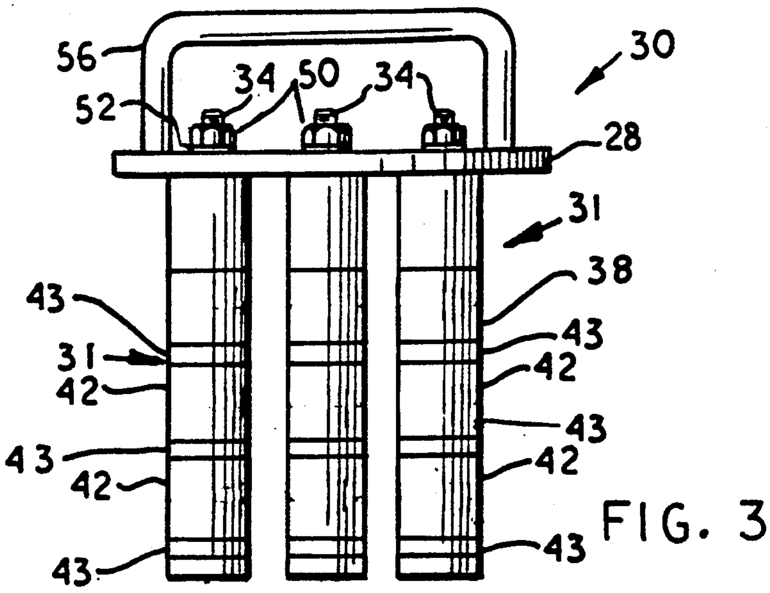
FIG. 3 is a side view of the magnet support plate, handle and magnet stacks.
Figure 4:
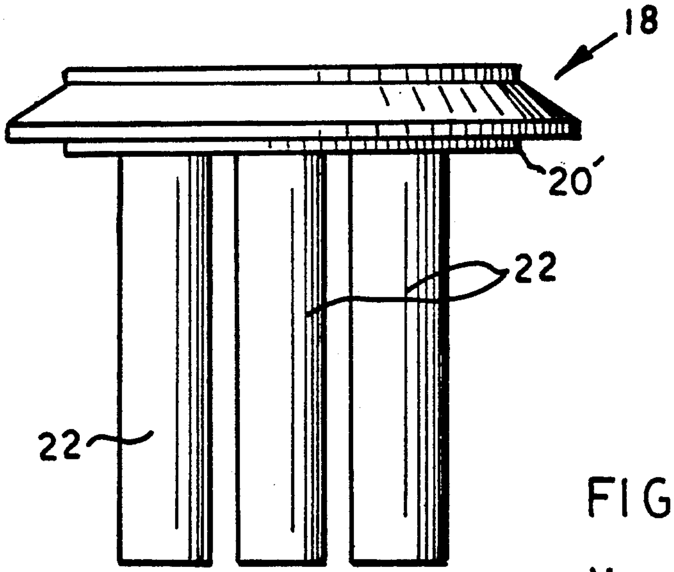
FIG. 4 is a side view of the cover plate and non-magnetic tubes.
Figure 5:
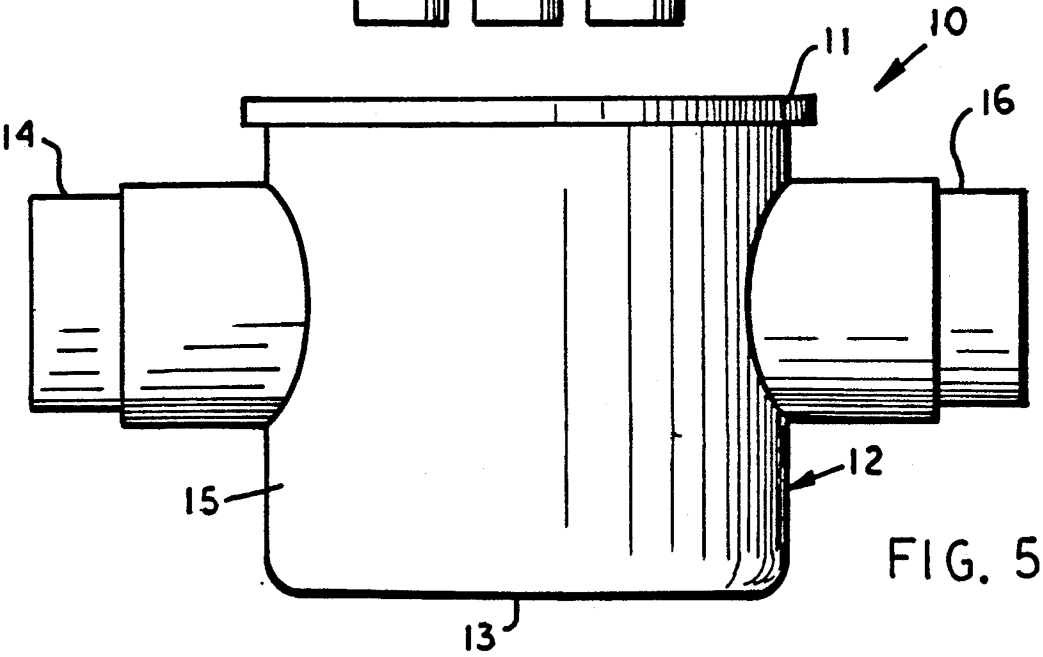
FIG. 5 is a side view of the trap body with cover and magnets removed.
Figure 6:
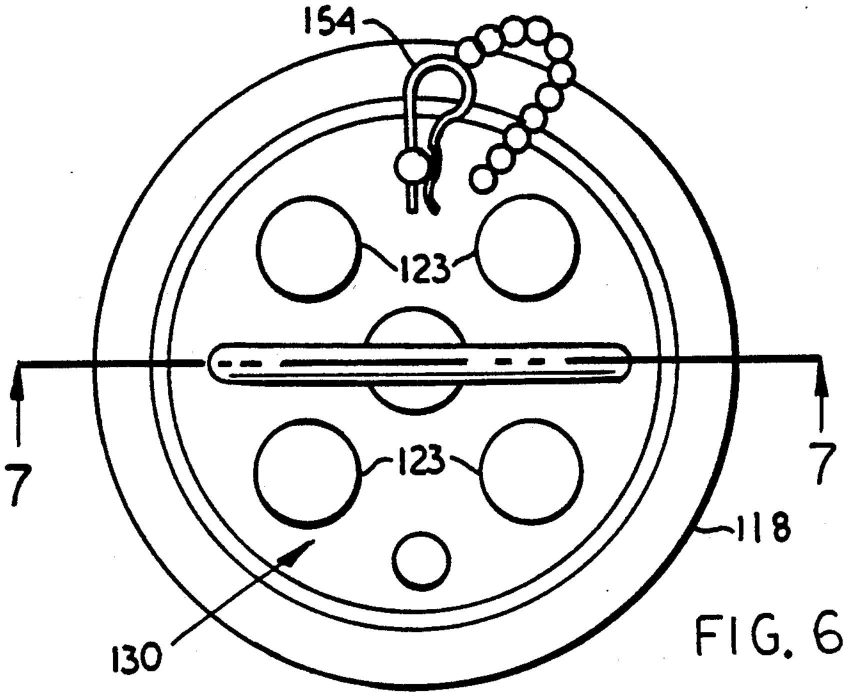
FIG. 6 is a top view of another embodiment of the trap.
Figure 7:
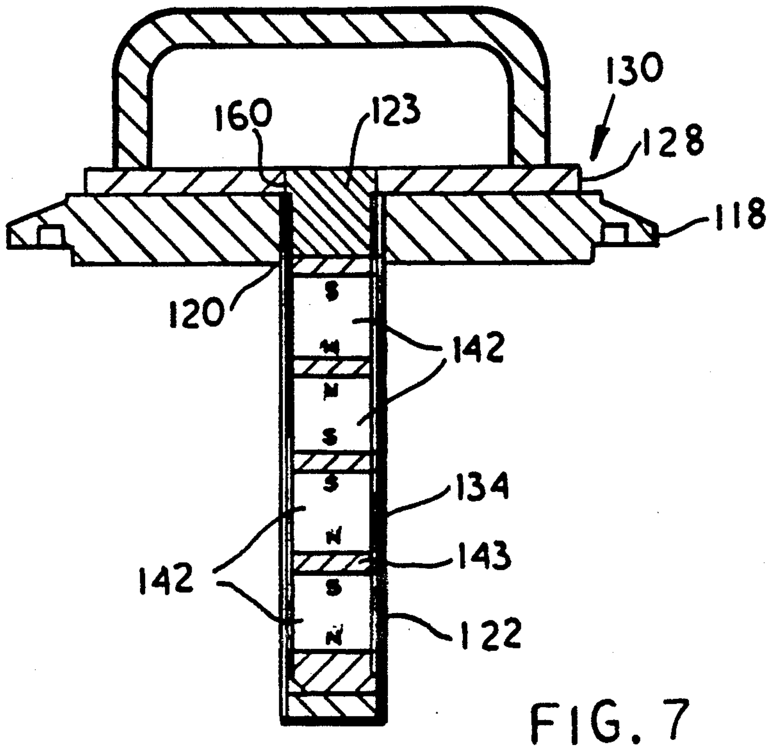
FIG. 7 is a cross sectional view of the trap taken on lines 7—7 of FIG. 6.

The embodiment of magnet assembly 130 shown in FIGS. 6 and 7 are like magnetic assembly 30 of FIGS. 2 and 3, except the rods 34 are eliminated and permanent magnets 142 of FIG. 7 are supported in second non-magnetic tubes 134. Second non-magnetic tubes 134 are freely received in first non-magnetic tubes 122. The upper ends of first non-magnetic tubes 122 are received in holes 120 in cover 118 and are held to cover 118 by soldering, brazing or other suitable fastening means. The upper end of second non-magnetic tubes 134 are closed by magnetic plugs 123. Permanent magnets 142 and pole pieces 143 are stacked in second non-magnetic tubes 134 with like poles of permanent magnets 142 adjacent iron pole pieces 143. Plug 123 is received in second holes 160 in magnet support plate 128.

When trap 10 becomes loaded with iron particles or pieces of iron, cover 18 and magnet assembly 30 may be removed from hollow body 12. The operator will then pull key 54 and lift magnet assembly 30 from cover 18 by handle 56. When magnetic assembly 30, with permanent magnets 42, is pulled out of non-magnetic tubes 22, the magnetic fields will be removed. This will release any magnetic material that has been attracted to non-magnetic tubes 22. When the magnetic particles have been removed, magnetic assembly 30 can be reassembled with cover 18 and trap 10 will then be ready for further use.

The trap equipped with the magnet assembly 130, shown in FIGS. 6 and 7, operates identically to trap 10 of FIGS. 1 through 5.

The foregoing specification sets forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a magnetic trap comprising of a hollow body, a cover, and a magnet assembly, said hollow body having an open top, a closed bottom, an inlet, an outlet, and side walls, said cover having a plurality of first spaced holes extending therethrough, a plurality of non-magnetic tubes having an open upper end and a closure member located at the lower end, said non-magnetic tubes extending through said cover and attached thereto, said cover resting on said hollow body so as to cover said open top with said non-magnetic tubes extending downward into said hollow body between said inlet and said outlet, said magnet assembly comprising a magnet support plate and a plurality of spaced magnet stacks attached to said magnet support plate and extending downward therefrom, said magnet stacks being spaced to permit extension downward into said non-magnetic tubes, first releasable fastening means for clamping said cover to said hollow body, second releasable fastening means for clamping said magnet support plate to said cover, whereby said first releasable fastening means can be released allowing said cover and said magnet support plate to be removed simultaneously from said body with iron material adhering to said non-magnetic tubes, and said second releasable fastening means can be released allowing said magnet assembly to be removed from said cover to release the iron material from said non-magnetic tubes.

2. The magnetic trap recited in claim 1 wherein said support means for supporting each said magnet stack on said magnet support plate comprises, second non-magnetic tubes being attached to said magnet support plate, each said second non-magnetic tube receiving a said magnet stack, said second non-magnetic tubes with said magnet stacks being spaced to permit extension downward into said first mentioned non-magnetic tubes.

3. The magnetic trap recited in claim 2 wherein said magnet stacks comprises a plurality of solid cylinders of permanent magnetic material.

* * * * *